No. 659,690. Patented Oct. 16, 1900.
O. W. OLSON & P. A. MYLLENBECK.
CORD KNOTTING DEVICE FOR GRAIN BINDERS.
(Application filed May 11, 1900.)
(No Model.) 4 Sheets—Sheet 1.
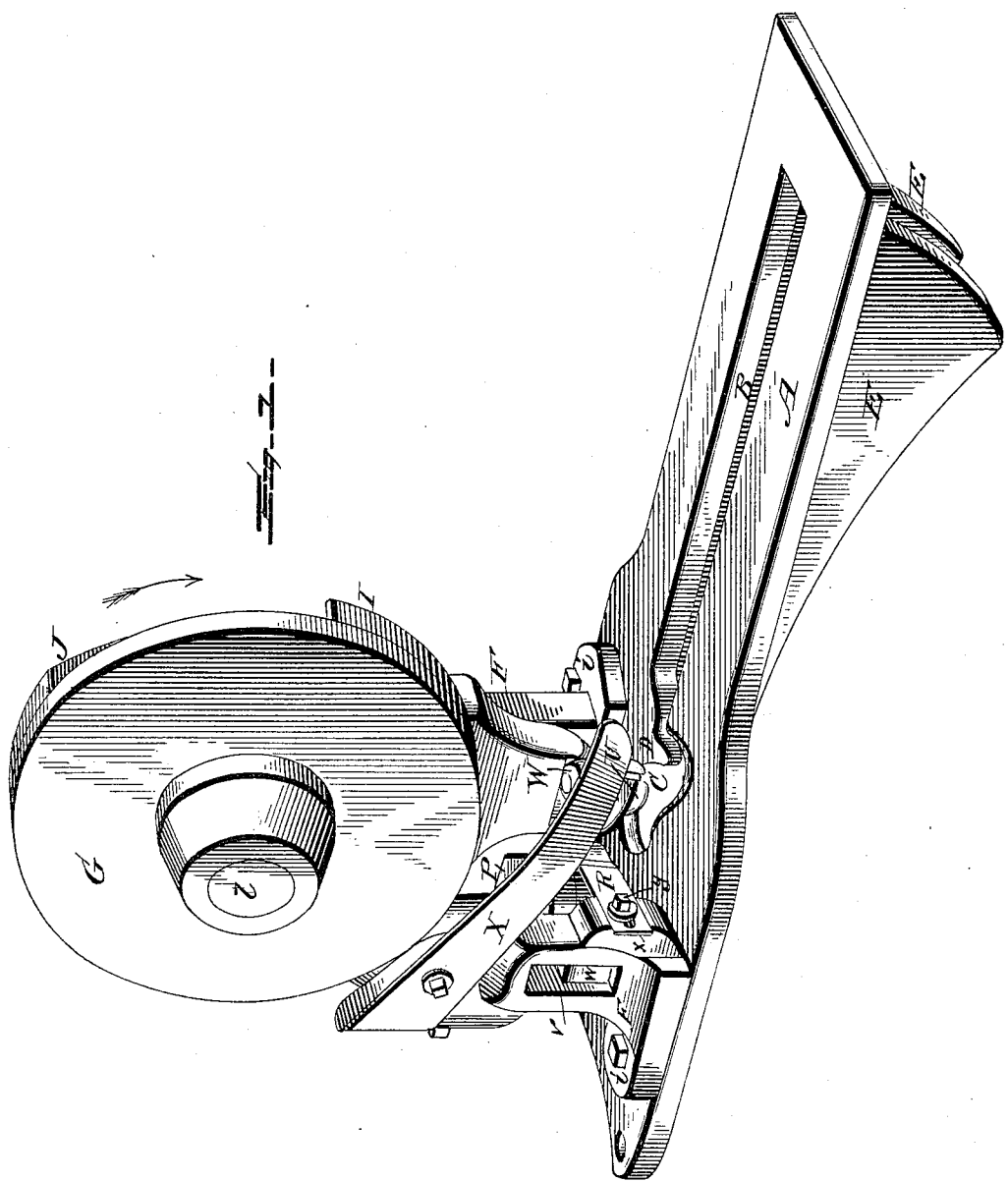
WITNESSES:
L. C. Hills
M. R. Goodwin
INVENTORS
O. W. Olson,
P. A. Myllenbeck.
By Chad H. Fowler,
Attorney

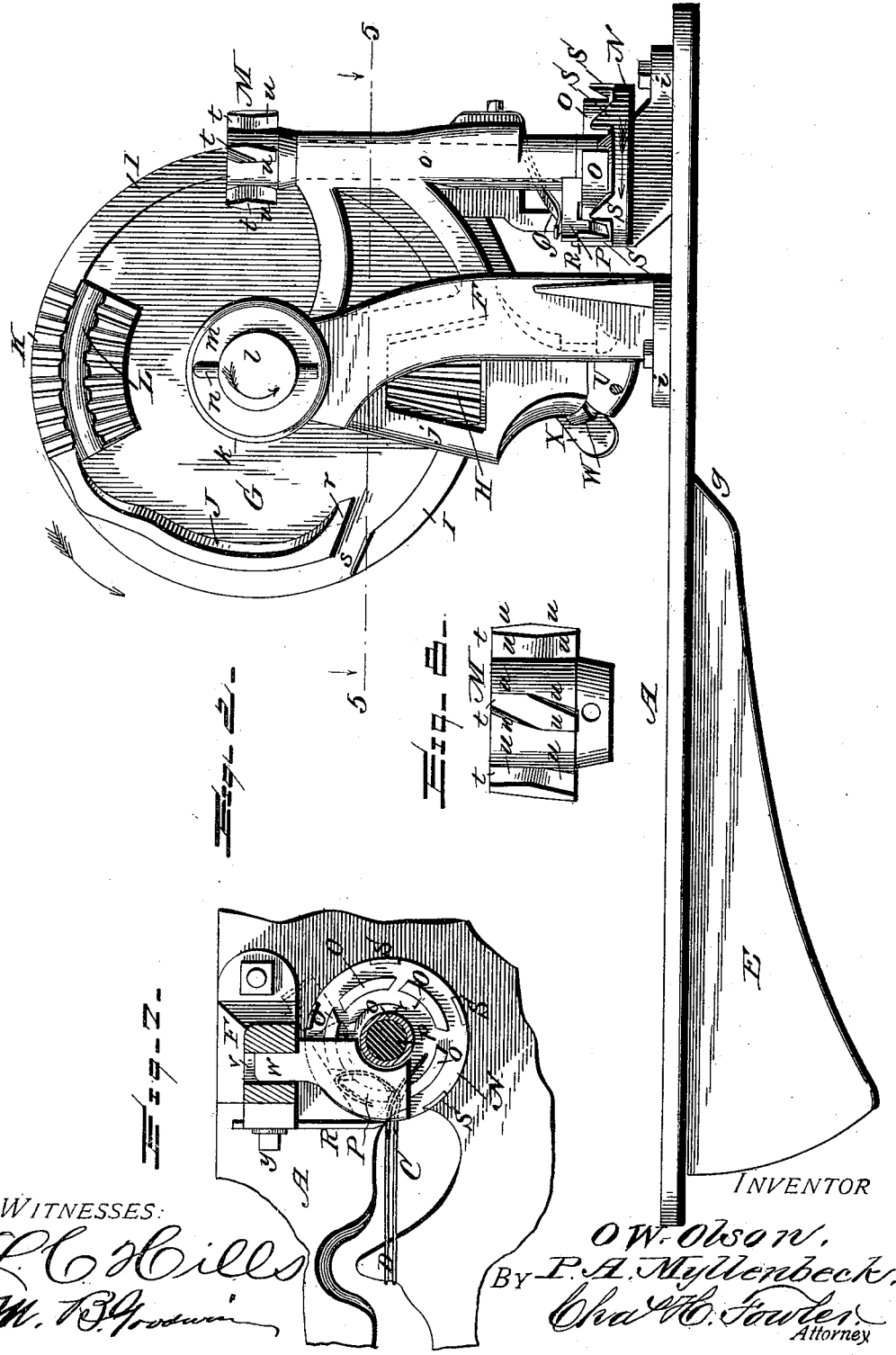

No. 659,690. Patented Oct. 16, 1900.
O. W. OLSON & P. A. MYLLENBECK.
CORD KNOTTING DEVICE FOR GRAIN BINDERS.
(Application filed May 11, 1900.)
(No Model.) 4 Sheets—Sheet 3.
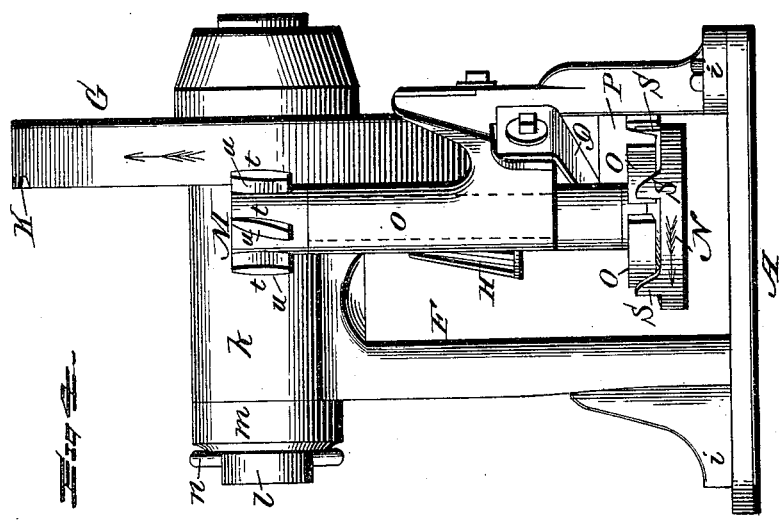
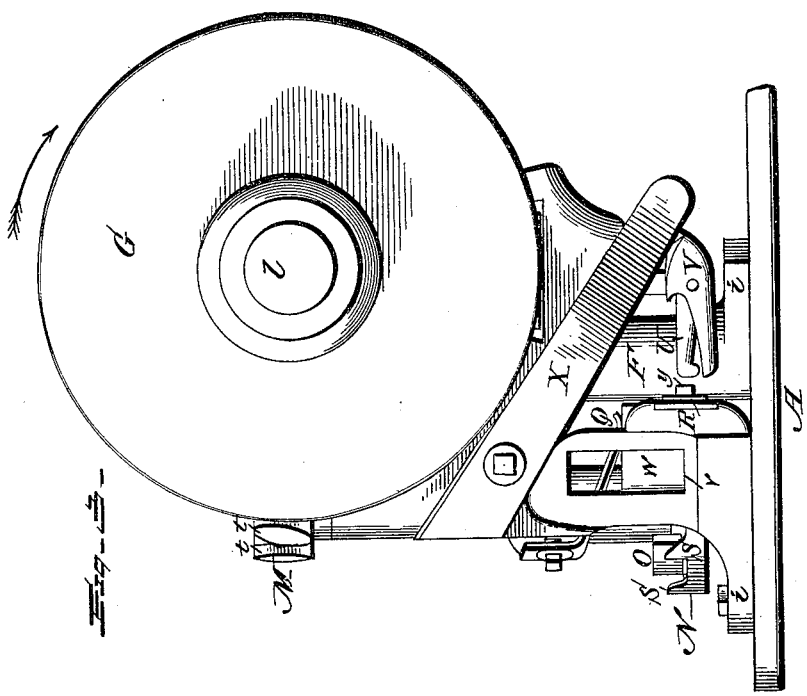
WITNESSES:
L. C. Hills.
M. B. Goodwin.
INVENTORS
O. W. Olson.
P. A. Myllenbeck.
BY Chas. H. Fowler
Attorney No. 659,690. Patented Oct. 16, 1900.
O. W. OLSON & P. A. MYLLENBECK.
CORD KNOTTING DEVICE FOR GRAIN BINDERS.
(Application filed May 11, 1900.)
(No Model.) 4 Sheets—Sheet 4.
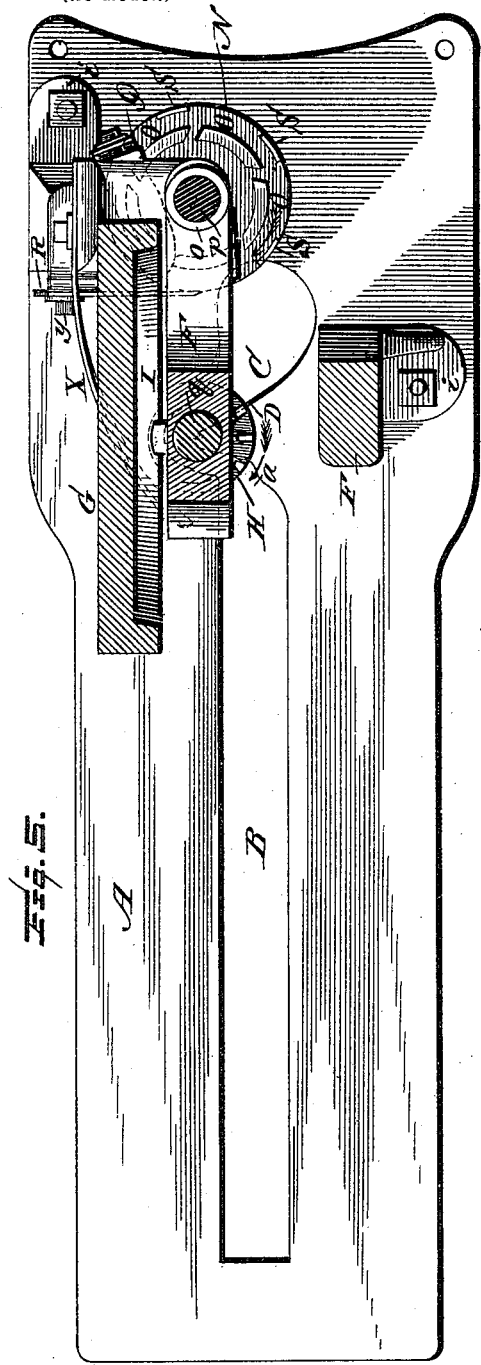
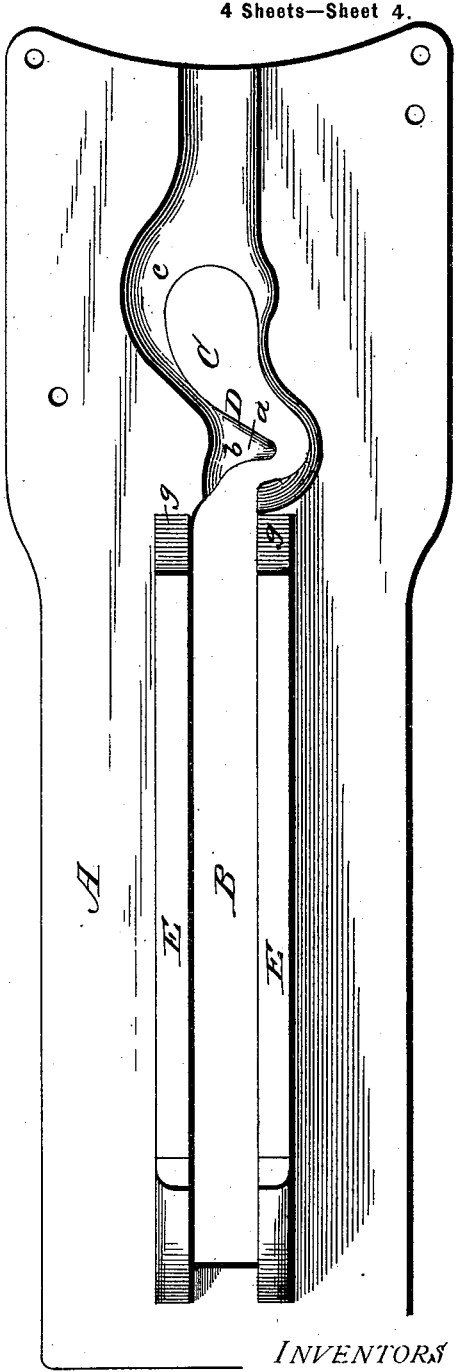

UNITED STATES PATENT OFFICE.

OLE W. OLSON AND PETER A. MYLLENBECK, OF RUTHTON, MINNESOTA.

CORD-KNOTTING DEVICE FOR GRAIN-BINDERS.

SPECIFICATION forming part of Letters Patent No. 659,690, dated October 16, 1900.

Application filed May 11, 1900. Serial No. 16,310. (No model.)

*To all whom it may concern:*

Be it known that we, OLE W. OLSON and PETER A. MYLLENBECK, citizens of the United States, residing at Ruthton, in the county of Pipestone and State of Minnesota, have invented certain new and useful Improvements in Cord-Knotting Devices for Grain-Binders; and we do hereby declare that the following is a full, clear, and exact description of the same, reference being had to the annexed drawings, making a part of this specification, and to the letters of reference marked thereon.

The present invention has relation to that class of knot-tying mechanism for grain-binders in which is employed a rotatable disk, a cord holder or gripper, and a knotter-bill connecting with the disk through suitable toothed gearing, whereby the same are operated.

It is the purpose of the invention to materially improve the construction of the above class of knotting mechanism, whereby its operation will be greatly simplified and its value materially enhanced, its construction rendered more simple and less liable to get out of order, and possessing increased strength and durability.

The invention consists in a knotting mechanism for grain-binders constructed substantially as shown in the drawings and hereinafter described and claimed.

Figure 1 of the drawings is a perspective view of a knotting mechanism constructed in accordance with our invention; Fig. 2, a side elevation thereof; Fig. 3, a similar view showing the reverse side thereof with the breastplate partly broken away; Fig. 4, an end view of the knotting mechanism; Fig. 5, a horizontal section taken on line 5 5 of Fig. 2; Fig. 6, an under side plan view of the breastplate; Fig. 7, a detail sectional plan view showing a portion of the breastplate and the cord holder or gripper with its connecting parts; Fig. 8, a detail view of the pinion on the cord-holder or gripper-shaft.

In the accompanying drawings, A represents the breastplate, which is without projection and perfectly flat upon its upper side and is formed with a rectangular cord-slot B, which terminates at its rear end in a curved opening C and laterally-projecting and arresting finger D. This arresting-finger D is pointed, as shown at $a$, and beveled upon its under side, as shown at $b$, the opening C being also beveled around its side walls, as shown at $c$, thereby decreasing the thickness of the edges around the opening and also of the finger. This opening C from the juncture of the cord-slot B throughout its length is substantially serpentine in shape, as shown in Fig. 6 of the drawings, which, in connection with the beveled walls of the opening, renders the breastplate more effective in preventing the needle from sticking or clogging in tough grain and enabling the cord to work freely without getting off or away from the knotter. Upon the under side of the breastplate A are parallel flanges E of the usual construction with their inner ends beveled, as shown at $g$ in Figs. 2 and 6 of the drawings.

Although the breastplate herein described possesses increased effectiveness and insures a more perfect operation of the knotter, it is evident that the plate may be variously modified or changed in its several details of construction without in any manner affecting the other features of the invention. The breastplate, however, in its form and construction is believed to be the most practical and effective in its purpose and rendering the knotting mechanism as a whole materially enhanced in value as an attachment to grain-binders. Therefore the breastplate in its present form is deemed most preferable.

To the breastplate A is suitably connected an upright frame F, of any desirable form and construction, which supports the operating parts of the knotting mechanism, said frame having feet $i$, by which the frame is bolted to the breastplate, or any other means may be provided for securing the frame to the plate. This frame F is formed with a horizontal tubular bearing $k$ for the shaft $l$ of the rotatable disk G, said shaft being held therein by a collar $m$ and pin $n$ or in any other desirable manner found best adapted to the purpose. The frame F is also provided with an upright tubular bearing $o$ for the shaft $p$ for the cord holder or gripper, as shown in Figs. 5 and 7 of the drawings.

The frame F is formed with a housing $j$ to receive a frusto-conical pinion H, which is suitably keyed on an upright shaft $q$, as shown in Fig. 5 of the drawings.

The rotatable disk G is provided at its edge or outer periphery with a segmental holding-flange I, which extends out at right angles to the plane of the disk and around a portion only of its circumference.

Upon the face of the disk G is a segmental cam J, which is disposed on a different part of the periphery than the flange I and terminates at one end in an inwardly-projecting extension $r$, which is upon an incline to present a diagonal space $s$ between the extension and the end of the flange, as shown in Fig. 2 of the drawings.

Upon the side of the disk G is a segmental rack K, having a segmental groove L and located between the flange I and the cam J. The segmental rack K is adapted to engage with the pinion H as it is brought opposite the pinion by the rotation of the disk, thereby operating the shaft $q$ of the pinion and also the knotter-bill upon the lower end thereof, which will be hereinafter described. The outer part of the segmental rack K and the segmental holding-flange I extend in turn between the teeth of the pinion M, to hold the shaft thereof and also the cord holder or gripper N upon the lower end thereof stationary until the cam J is brought in contact with the pinion M, which it will turn, and the segmental rack K in contact with the pinion H, which it will turn, thereby imparting to both the cord holder or gripper and the knotter-bill an intermittent movement necessary to the operation thereof. The segmental groove L in the segmental rack K permits the latter to pass the teeth of the pinion H. This pinion M is of peculiar construction and is especially adapted to its successful operation in connection with the holding-flange and the cam upon the rotatable disk. The teeth $t$ of this pinion are disposed on an incline to the axis of the hub thereof, or, in other words, the teeth are diagonal, as shown in Fig. 8 of the drawings, and upon each side of the teeth are double inclines $u$. These inclines start from the center of the tooth and extend outward or toward the ends of the tooth, leaving the center of greater thickness than the ends, forming substantially a diamond-shaped tooth diagonal or inclined to the axis of the hub of the pinion.

The cord holder or gripper N may be connected to the lower end of the shaft $p$ in any suitable and well-known manner that will admit of the holder or gripper rotating therewith. This cord holder or gripper N is provided upon its upper side with concentric segmental ribs O, and as these segmental ribs are successively brought around under a grooved guide-shoe P as the holder or gripper rotates each segmental rib will engage the groove in the under side of the shoe and carry the cord against the end thereof to hold it while being cut, the cord holder or gripper catching the cord and bringing it forward to allow the knotter-bill to feed from it and hold it in position to be cut by the knife R.

The shoe P is spring-actuated by means of the flat bearing-spring Q, one end of the spring being detachably connected to the frame F and the opposite end free to bear on the upper side of the shoe, and by detaching the spring the shoe may be withdrawn from the frame.

In order to provide means for removably supporting the shoe in the frame and allowing of its vertical movement, the shoe is provided with a shank $w$, which enters a guide-slot $v$ in the frame, as shown in Figs. 1, 3, and 7 of the drawings.

Any suitable and well-known means may be provided for rendering the shoe removable from the frame and also to enable it to move up and down to yield to any undue pressure or to adapt it, with the cord holder or gripper, to cord of varying thickness, and any suitable spring may be employed to render the shoe spring-actuated, this being left entirely to judgment in the construction of the knotting mechanism.

The spring Q keeps the shoe P pressed down in proper engagement with the ribs O as they are brought successively in contact with the groove in the shoe.

The cord holder or gripper N upon its outer edge is provided with blades S, and coming in contact with the inner side of the knife R as the cord holder or gripper is rotated will give a sheer cut in severing the cord. The knife R is rendered adjustable upon the frame F by means of a slot $x$ in the heel of the knife and a set-screw $y$, by which adjustability the knife can be placed in operative position even should it be shortened by continued sharpening.

The cord holder or gripper is rotated forward at two different times, as is common in this class of knotting mechanism, it rotating to secure the cord and place it in front and close to the cutting edge of the knife and also to allow the knotter-bill to feed from it in the usual manner. As the cord holder or gripper is moved forward it stops until the knot has been tied, after which it again moves forward to bring the cord in position to be cut, and again is brought into position to receive the cord, and the operation repeated. The knotter-bill consists of the stationary jaw U and the pivoted jaw V upon the lower end of the shaft $q$, the pivoted jaw being controlled by a roller W at its end, which acts upon a plate-spring X in the usual manner, the knotter-bill being of any well-known construction, as is also the plate-spring and roller.

The operation of our improved cord-knotter is as follows, the parts moving in the direction indicated by the feathered arrows: In the normal state of rest while the gavel is being formed on the binder the parts are in the position relatively to each other, as shown in Fig. 2. As soon as the bundle is formed and the binding mechanism is set in operation by a trip or by other means the first movement of the disk-shaft and disk G closes the needle-arm and brings the cord up and over the bundle, resting the cord on the finger D and over the end of the knotter-bill, and places the cord into the gripper N between a segmental rib O and the shoe P. The continued rotation of disk-shaft brings the segmental rack K on the disk G into engagement with the pinion H of the knotter-shaft. The engagement of the segmental rack with the pinion H will take place at the same time as the segmental cam J engages with the pinion M on the cord-holder shaft. The continued movement of the disk-shaft rotates both the knotter-hook and the cord-holder by means of the segmental rack K and cam J, which respectively engage with the pinions on the shafts. The knotter and cord-holder start in operation at the same time. When the knotter has made about one-eighth of a revolution, the cord-holder at that period of time stops, as the cord-holder has secured the cord at this time. When the knotter has made about one-quarter of a revolution, it secures the two cords on the finger D, and when the knotter has made about one-half of a revolution it opens its jaws and continues its revolution until the knotter-bill has passed the cord-holder and has also secured the strands of cord between its upper and lower jaws and closing its jaws and stopping at the left side of the cord-holder with the knotter-bill pointing backward. During the revolution of the knotter the cord-holder has been standing still and feeding the cord to the knotter. When the knotter has come to a stop, the cord-holder makes its second movement and severs the strands of cord and places itself into position for another engagement.

It is evident that many changes or modifications in the several details of construction may be resorted to without in any manner affecting the essential features of the invention, and any such changes as would be considered as within ordinary mechanical skill and judgment may be made without departing from the principle of the invention.

Having now fully described our invention, what we claim as new, and desire to secure by Letters Patent, is—

1. A cord-knotting device for grain-binders comprising a breastplate, a frame constructed with a horizontal tubular bearing, an upright tubular bearing, and an upright housing, a disk-shaft mounted in the horizontal tubular bearing, a disk having a segmental rack, a segmental holding-flange extending from one end of the segmental rack, a segmental cam extending from the other end of the segmental rack, and having an inwardly-projecting extension providing a tooth space or passage between the extension and the adjacent end of the segmental holding-flange, a gripper-shaft mounted in the upright tubular bearing, a pinion secured to the upper end of the gripper-shaft between the teeth of which the extension, segmental cam, segmental holding-flange, and a part of the segmental rack are adapted to travel, a gripper secured to the lower end of the gripper-shaft, having concentric segmental ribs, between which the cord travels, a grooved guide-shoe through which the concentric segmental ribs travel, and a knotter-shaft, mounted in the housing and having a pinion with which the segmental rack engages.

2. A cord-knotting device for grain-binders comprising a breastplate, a frame constructed with a horizontal tubular bearing, an upright tubular bearing, and an upright housing, a disk-shaft mounted in the horizontal tubular bearing, a disk having a segmental rack, a segmental holding-flange extending from one end of the segmental rack, a segmental cam extending from the other end of the segmental rack, and having an inwardly-projecting extension providing a tooth space or passage between the extension and the adjacent end of the segmental holding-flange, a gripper-shaft mounted in the upright tubular bearing, a pinion secured to the upper end of the gripper-shaft between the teeth of which the extension, segmental cam, segmental holding-flange, and a part of the segmental rack are adapted to travel, a gripper secured to the lower end of the gripper-shaft, having concentric segmental ribs, between which the cord travels, and a series of peripheral blades, an adjustable knife against which the blades sever the cord, a grooved guide-shoe through which the concentric segmental ribs travel, and a knotter-shaft mounted in the housing and having a pinion with which the segmental rack engages.

3. A cord-knotting device for grain-binders comprising a breastplate, a frame constructed with a horizontal tubular bearing, an upright tubular bearing, and an upright housing, a disk-shaft mounted in the horizontal tubular bearing, a disk having a segmental rack, provided with a dividing-groove through which the teeth of the gripper-pinion pass, a segmental holding-flange extending from one end of the segmental rack, a segmental cam extending from the other end of the segmental rack, and having an inwardly-projecting extension providing a tooth space or passage between the extension and the adjacent end of the segmental holding-flange, a gripper-shaft mounted in the upright tubular bearing, a pinion secured to the upper end of the gripper-shaft between the teeth of which the extension, segmental cam, segmental holding-flange, and a part of the segmental rack are adapted to travel, a gripper secured to the lower end of the gripper-shaft, having concentric segmental ribs, between which the cord travels, a grooved guide-shoe through which the concentric segmental ribs travel, and a knotter-shaft, mounted in the housing and having a pinion with which the segmental rack engages.

In testimony that we claim the above we have hereunto subscribed our names in the presence of two witnesses.

OLE W. OLSON.
PETER A. MYLLENBECK.

Witnesses to Ole W. Olson's signature:
JACOB F. CARLSON,
O. B. JOHMIS.

Witnesses to the signature of Peter A. Myllenbeck:
F. L. LARSEN,
A. LARSEN.